US008837804B2

(12) United States Patent
Su et al.

(10) Patent No.: US 8,837,804 B2
(45) Date of Patent: Sep. 16, 2014

(54) METHOD AND DEVICE FOR TESTING VALUE DOCUMENTS

(75) Inventors: Shanchuan Su, Neubiberg (DE); Jürgen Schützmann, Pfaffenhofen (DE); Helmut Steidl, München (DE); Dieter Stein, Holzkirchen (DE)

(73) Assignee: Giesecke & Devrient GmbH, Munich (DE)

( * ) Notice: Subject to any disclaimer, the term of this patent is extended or adjusted under 35 U.S.C. 154(b) by 1309 days.

(21) Appl. No.: 12/597,404

(22) PCT Filed: Apr. 22, 2008

(86) PCT No.: PCT/EP2008/003220

§ 371 (c)(1), (2), (4) Date: Oct. 23, 2009

(87) PCT Pub. No.: WO2008/128755

PCT Pub. Date: Oct. 30, 2008

(65) Prior Publication Data

US 2010/0128934 A1 May 27, 2010

(30) Foreign Application Priority Data

Apr. 23, 2007 (DE) ........................ 10 2007 019 107

(51) Int. Cl.
*G06K 9/00* (2006.01)
*G07D 7/00* (2006.01)

(52) U.S. Cl.
CPC ........................................ *G07D 7/00* (2013.01)
USPC .......................................... 382/135; 382/137

(58) Field of Classification Search
None
See application file for complete search history.

(56) References Cited

U.S. PATENT DOCUMENTS 3,564,268 A * 2/1971 Bayne et al. .................. 250/556
4,041,456 A * 8/1977 Ott et al. ....................... 382/135

(Continued)

FOREIGN PATENT DOCUMENTS

| | | | |
|---|---|---|---|
| CA | 2266290 | A1 | 9/1999 |
| DE | 10113268 | A1 | 9/2002 |
| DE | 202005021081 | U1 | 3/2007 |
| EP | 0947964 | A1 | 10/1999 |

OTHER PUBLICATIONS

Steinbrecher, R., "Image Processing in Practice", pp. 137-174, 2005.

(Continued)

*Primary Examiner* — Avinash J Yentrapati
(74) *Attorney, Agent, or Firm* — Bacon & Thomas, PLLC

(57) ABSTRACT

The invention relates to a method and apparatus for recognizing forged value documents, for example composed forgeries which are assembled from parts of different value documents. In the inventive method, the signal intensity of a measuring signal is determined at a plurality of measuring points on a value document. For one or more selected groups of measuring points which are disposed in particular along certain directions on the value document there are determined gradient values of the signal intensities. The gradient values of a group are subsequently linked to form a connection strength of the group which provides a quantitative statement about the extent to which a large gradient value exists consistently within the particular group. From a relatively great connection strength there can be inferred the presence of a separating line in the area of the selected group of measuring points.

22 Claims, 3 Drawing Sheets

(56) References Cited

U.S. PATENT DOCUMENTS

| | | | | | |
|---|---|---|---|---|---|
| 4,096,991 | A * | 6/1978 | Iguchi | | 235/455 |
| 4,143,279 | A * | 3/1979 | Ehrat et al. | | 250/556 |
| 4,435,834 | A * | 3/1984 | Pauli et al. | | 382/135 |
| 4,464,786 | A | 8/1984 | Nishito | | |
| 4,464,789 | A * | 8/1984 | Sternberg | | 382/291 |
| 4,547,899 | A * | 10/1985 | Nally et al. | | 382/139 |
| 4,906,988 | A * | 3/1990 | Copella | | 340/5.86 |
| 5,014,325 | A * | 5/1991 | Moritomo | | 382/135 |
| 5,014,857 | A * | 5/1991 | Kondo | | 209/534 |
| 5,026,974 | A * | 6/1991 | Franklin et al. | | 235/449 |
| 5,533,144 | A * | 7/1996 | Fan | | 382/135 |
| 5,832,104 | A * | 11/1998 | Graves et al. | | 382/135 |
| 6,091,844 | A * | 7/2000 | Fujii et al. | | 382/135 |
| 6,181,813 | B1 * | 1/2001 | Fan et al. | | 382/135 |
| 6,373,973 | B2 * | 4/2002 | Neri et al. | | 382/135 |
| 6,453,061 | B1 * | 9/2002 | Neri et al. | | 382/135 |
| 6,473,165 | B1 * | 10/2002 | Coombs et al. | | 356/71 |
| 6,516,078 | B1 * | 2/2003 | Yang et al. | | 382/100 |
| 6,970,236 | B1 * | 11/2005 | Markantes et al. | | 356/71 |
| 7,184,584 | B2 * | 2/2007 | Sacher et al. | | 382/141 |
| 8,083,136 | B1 * | 12/2011 | Brown et al. | | 235/380 |
| 8,144,368 | B2 * | 3/2012 | Rodriguez et al. | | 358/3.28 |
| 2001/0006557 | A1 * | 7/2001 | Mennie et al. | | 382/135 |
| 2002/0001393 | A1 * | 1/2002 | Jones et al. | | 382/100 |
| 2004/0061855 | A1 * | 4/2004 | Klock et al. | | 356/328 |
| 2004/0208351 | A1 * | 10/2004 | Yoshida et al. | | 382/137 |
| 2004/0237047 | A1 * | 11/2004 | Houle et al. | | 715/541 |
| 2004/0263911 | A1 * | 12/2004 | Rodriguez et al. | | 358/3.28 |
| 2005/0141759 | A1 * | 6/2005 | Mori et al. | | 382/135 |
| 2007/0131517 | A1 * | 6/2007 | Voss | | 194/206 |
| 2008/0089573 | A1 * | 4/2008 | Mori et al. | | 382/135 |
| 2012/0070062 | A1 * | 3/2012 | Houle et al. | | 382/137 |

OTHER PUBLICATIONS

Steinbrecher, R., translation of extracts from “Image Processing in Practice”, 2005.

International Search Report regarding PCT/EP2008/003220, Aug. 1, 2008.

Search Report of German Patent Office regarding German Patent Application No. 10 2007 019 107.5, Feb. 1, 2010.

* cited by examiner

| | a | b | c |
|---|---|---|---|
| 1 | 0,2 | 0,2 | 0,2 |
| 2 | 0,5 | 0,8 | 0,5 |
| 3 | 1,1 | 1,3 | 0,4 |
| 4 | 3,2 | 1,4 | 0,4 |
| 5 | 1,0 | 1,1 | 0,5 |
| 6 | 0,3 | 1,3 | 0,4 |
| 7 | 0,2 | 1,2 | 0,5 |
| 8 | 0,3 | 1,0 | 0,6 |
| 9 | 0,5 | 1,1 | 0,5 |
| 10 | 0,6 | 1,2 | 0,7 |
| 11 | 0,6 | 1,3 | 0,5 |
| 12 | 0,5 | 1,2 | 0,5 |
| $V_{a/b/c}$ | $2,8 \cdot 10^{-3}$ | 5,1 | $4,2 \cdot 10^{-4}$ |
| $R_{a/b/c}$ | $1 \cdot 10^{-2}$ | $1 \cdot 10^{-3}$ | $1 \cdot 10^{-3}$ |

Fig. 2c

METHOD AND DEVICE FOR TESTING VALUE DOCUMENTS

FIELD OF THE INVENTION

This invention relates to a method for checking value documents, in particular for recognizing forged value documents, and to an apparatus for carrying out the method. The forged value documents to be recognized are composed forgeries which are assembled from parts of different value documents. The composed forgeries can be assembled from parts of authentic and forged value documents, but composed forgeries are also known that are assembled exclusively from parts of authentic value documents.

BACKGROUND

From the prior art, different methods are known for recognizing forged bank notes. Composed forgeries whose individual parts are glued together with adhesive tape can in some cases be found indirectly via recognition of the adhesive tape by means of a reflectance measurement. However, this is not possible in every case of a glued-together composed forgery. For an authenticity check the bank notes are furthermore checked for example for properties distinguishing authentic bank-note paper from ordinary paper, for example for its fluorescence properties. Many composed forgeries consist partly of authentic paper and partly of forged paper possessing similar fluorescence properties to authentic bank notes, however. Moreover, forgeries are also assembled that consist exclusively of parts of authentic bank notes. With conventional methods it is not possible to reliably recognize those composed forgeries that provide comparable measuring signals, e.g. fluorescence signals, to authentic bank notes.

SUMMARY

It is hence an object of the invention to specify a simple possibility for reliable recognition of forged value documents, in particular composed forgeries.

In the inventive method there are determined, in a first step, the signal intensities of a measuring signal at a plurality of measuring points on a value document. Subsequently, a group of said measuring points is selected. Alternatively, the group of measuring points can already be selected before determination of the signal intensities. In a further step, gradient values of the signal intensities are determined for the measuring points of the group. For ascertaining a connection strength of the group, the gradient values within the group are linked with each other. The connection strength is evaluated, for example by comparing the connection strength to a reference connection strength valid for the group.

The inventive method serves to recognize forged value documents, for example to recognize composed forgeries. In particular, the value document is thereby checked for the presence of separating lines at which the value document is assembled or at which individual components are interconnected for forming the value document. Generally, a composed forgery can have one separating line or a plurality of separating lines at which it is assembled.

The comparison of the connection strength to the associated reference connection strength results in a difference that is specific to the selected group of measuring points. Evaluation of the size of the difference can be effected in addition to a simple comparison of whether the particular connection strength is smaller or greater than the associated reference connection strength. From the difference or from the size of the difference there can be derived a probability of a separating line, or at least a segment of a separating line, being disposed in the particular group of measuring points. In the event that the connection strength strongly exceeds the reference connection strength, e.g. above a certain threshold value, a higher probability of the presence of a separating line can be inferred within the measuring points of the particular group than e.g. if the reference connection strength is only exceeded slightly.

For determining the signal intensities there is determined at least one curve of the signal intensity of the measuring signal as a function of the place on the value document, e.g. a two-dimensional distribution of the signal intensity. The two-dimensional distribution of the signal intensity can be determined over the total value document or also over one or more partial areas of the value document.

The connection strength of the particular group of measuring points provides a quantitative statement about the extent to which a large gradient value exists consistently within the group, in particular along a certain direction on the value document. For ascertaining the connection strength there can be formed for example the product of the gradient values within the group or also the sum thereof. However, other mathematical operations are also conceivable for linking the gradient values of the measuring points of a group with each other.

In a development of the method, the signal intensities are normalized to reference intensities that are preferably specific to the particular measuring point. The signal intensities are for example normalized on each of the measuring points to a reference intensity valid for the particular measuring point. The reference intensities can be ascertained, or have been ascertained prior to the check, on the basis of a multiplicity of authentic value documents. The reference intensity of a measuring point can be given by an average of the signal intensities that were determined for the particular measuring point on the basis of the multiplicity of value documents.

Besides the reference intensities of the measuring points, the reference connection strength valid for a group of measuring points can also be determined, or have been determined prior to the check, on the basis of a multiplicity of authentic value documents. The reference connection strength of a group can be given by an average of connection strengths that was determined for the particular group of measuring points on the basis of the multiplicity of value documents.

Preferably, the reference intensities and/or the reference connection strengths are ascertained on the basis of value documents of the type of the value document to be checked, in the case of bank notes for example on the basis of bank notes of the same denomination. For the different types of value documents, specific reference intensities and/or specific reference connection strengths can be stored in each case. The reference intensities and/or the reference connection strengths can be selected on the basis of the type of the value document, for example the currency and denomination of a bank note. For selecting the reference intensities valid for the value document to be checked and/or the reference connection strengths, the type of the value document is identified for example before the check of the value document. In the case of bank notes this identification can be e.g. a determination of denomination preceding the inventive method.

For determining the gradient values there is formed, in one embodiment, the first derivative of the signal intensity along a first direction on the value document for each of the measuring points of the selected group. The gradient value of the signal intensity at the particular measuring point can be for example proportional to the absolute value of the first derivative of the signal intensity at the particular measuring point, the first derivative being formed along the first direction on the value document.

In a further embodiment, there is formed for each of the measuring points of the selected group, for determining the particular gradient value, at least one difference from the signal intensity at the particular measuring point and the signal intensity at least at one neighboring measuring point, the neighboring measuring points being neighboring to the particular measuring point along a first direction on the value document. For example, the gradient value of the signal intensity at the particular measuring point can be proportional to the absolute value of the difference that is formed from the signal intensity at the particular measuring point and the signal intensity at least at one neighboring measuring point.

The first direction preferably extends along a transport direction of the value document, in particular approximately parallel to a longitudinal direction of the value document or approximately perpendicular to the longitudinal direction, i.e. approximately parallel to the shorter side of the value document. The value document is guided along the transport direction past a sensor with which the signal intensities of the measuring signal are determined.

In a special embodiment, the measuring points of the group are disposed along a second direction on the value document. The second direction preferably extends at a non-zero angle to the first direction, for example vertically to the first direction.

In the inventive methods, the measuring signal employed is for example an optical measuring signal which is in particular in the visible or in the non-visible spectral range. The measuring signal can be a luminescence signal that is emitted by the value document, for example a luminescence signal excited by UV light, in particular a fluorescence signal.

In a development of the method, there is additionally selected at least one further group of the measuring points at which the signal intensity of the measuring signal is determined. The selection of the further groups can be effected for example directly after the selection of the previously selected group. Alternatively, the selection of the further groups can also be effected during or after the carrying out of one or more of the inventive method steps that follow the selection of the previously selected group, for example after ascertaining the connection strength for the previously selected group. After selection of a further group, further gradient values of the signal intensities are determined for the measuring points of the particular further group. For ascertaining a further connection strength of the particular further group the further gradient values are linked with each other. Subsequently the further connection strength is evaluated. For evaluation, the further connection strength is compared for example to a further reference connection strength that was ascertained for the measuring points of the particular further group, e.g. on the basis of authentic value documents. For the different selected groups the same or also individual reference connection strengths can be employed.

If the connection strength and/or the further connection strength exceeds the reference connection strength valid for the particular group, there is a high probability that at least a segment of a separating line extends within the measuring points of said group. The checked value document can then be sorted out on suspicion of the presence of a composed forgery.

The selection of which measuring points are combined into a group is orientated for example by the places on a value document where the separating lines of composed forgeries are typically positioned. In a development of the method, the selection of the group is hence effected in dependence of a typical separating line position on the value document, the typical separating line position being ascertained on the basis of a plurality of forged value documents. For ascertaining a typical separating line position, the positions of the separating lines of a plurality of known composed forgeries are for example detected and statistically evaluated. In dependence thereof the groups of the measuring points can then be selected for the inventive method. The selection of the groups is effected e.g. in such a way that the total value document or also a partial area of the value document is checked for the presence of separating lines.

The selection of the further groups can also be effected in dependence of the connection strength of the previously selected group or of a plurality of previously selected groups. Furthermore, the selection of the further groups can also be effected in dependence of at least one difference between the connection strength of at least one previously selected group and the reference connection strength of the at least one previously selected group.

Through the further groups it is possible to check a part of the area and/or immediate surroundings of the area that was already checked through the first group. If for example a relatively great connection strength of a first group of measuring points yields an indication of a possible separating line—if e.g. a segment of a non-straight separating line is detected—there could be selected further groups of measuring points in the immediate surroundings of the first group. By means of the further groups it is possible to check the suspicious area of the value document and/or its immediate surroundings at different angles.

As further groups for checking the suspicious area it is also possible to select measuring points that are not disposed over the total value document, but in each case only over a portion of the value document. The further groups can contain a subset of one or more previously selected groups or be a subset thereof. By means of the further groups it is thus also possible to check a partial area of a previously checked area.

In a special embodiment, the measuring points of a plurality of selected groups are disposed parallel to each other on the value document. However, the measuring points of the selected groups can also be disposed along different directions on the value document.

Another aspect of the invention relates to the apparatus that is employed for carrying out the inventive method. Said apparatus preferably has a sensor for determining the signal intensities of the measuring signal. The sensor can be an image sensor for detecting optical features of value documents, for example of bank notes, and preferably has at least one detector row for determining the signal intensities of the measuring signal.

BRIEF DESCRIPTION OF THE DRAWINGS

Hereinafter the invention will be described by way of example with reference to the accompanying drawings.

Therein are shown.

DETAILED DESCRIPTION OF VARIOUS EMBODIMENTS

Figure 1A:
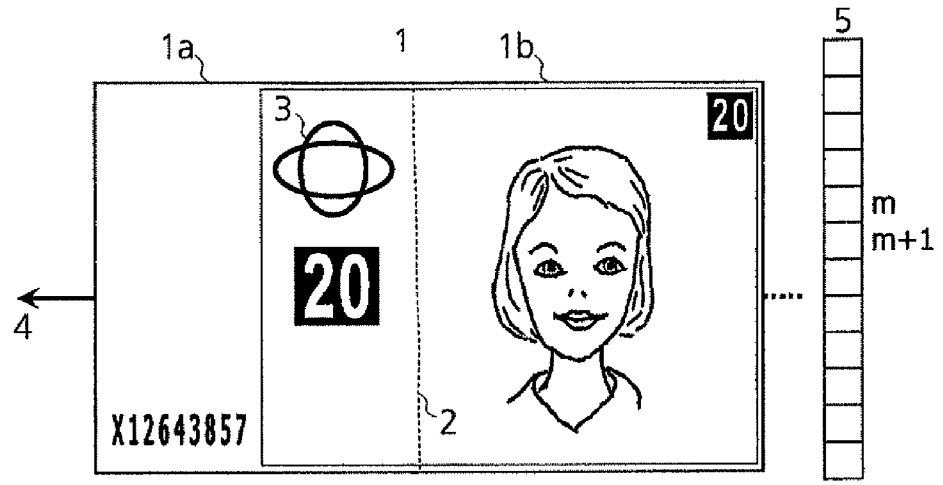
FIG. 1*a* a schematic picture of a composed forgery that is assembled from two parts, FIG. 1*b* a sketched curve of the signal intensity $s_m$ of the measuring track m and of the gradient values $g_m$ of the measuring track m, FIG. 1*c* a sketched curve of the signal intensity $s_{m+1}$ of the measuring track m+1 and of the gradient values $g_{m+1}$ of the measuring track m+1, FIG. 2*a* a two-dimensional arrangement of the measuring points in the form of a grid on the composed forgery, FIG. 2*b* three groups (a, b, c) of measuring points with measuring points disposed parallel to each other, FIG. 2*c* a table of exemplary gradient values of the groups a, b, c as well as connection strengths $V_a$, $Y_b$, $V_c$ ascertained therefrom and associated reference connection strengths $R_a$, $R_b$, $R_c$, and FIG. 3 five groups (a', b', c', d', e') of measuring points with measuring points disposed obliquely to the transport direction, along different directions.

In FIG. 1*a* there is schematically shown a composed forgery 1 which is assembled from two parts, for example a left, authentic partial bank note 1*a* and a right, false partial bank note 1*b*. At a separating line 2 running approximately vertically through the composed forgery 1 the two partial bank notes 1*a* and 1*b* are glued together. On the authentic partial bank note 1*a* there is shown by way of example a security element 3 which fluoresces under UV illumination. For an authenticity check, the composed forgery 1 is moved under a detector row 5 along the transport direction x marked by the arrow 4. The detector row 5 is part of a sensor for checking value documents, which detects the signal intensity of the fluorescence of the composed forgery 1 to be checked, as a function of time or as a function of the place x on the composed forgery 1. The detector row 5 possesses a plurality of measuring tracks which are disposed perpendicular to the transport direction (in the y direction), inter alia the two measuring tracks m and m+1, whose signals will be considered hereinafter by way of example.

Figure 1B:
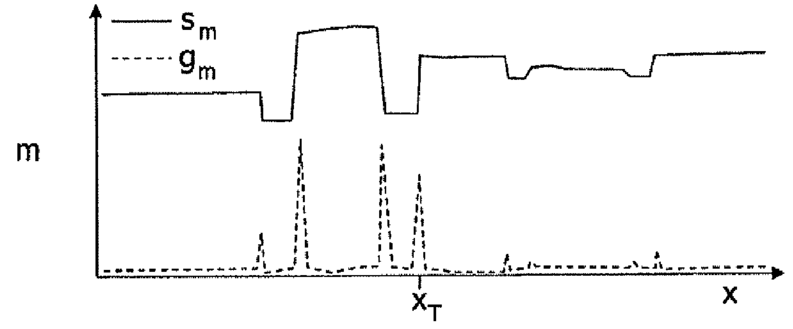
Figure 1C:
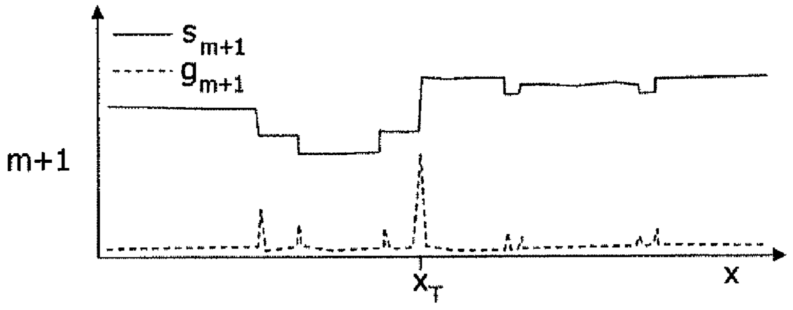

FIGS. 1*b* and 1*c* show the signal intensity $s_m$ of the measuring track m and the gradient values $g_m$ of the measuring track m as well as the signal intensity $s_{m+1}$ of the measuring track m+1 and the gradient values $g_{m+1}$ of the measuring track m+1 as a function of the place x on the composed forgery 1. The signal intensities $s_m$ and $s_{m+1}$ have at the place $x_T$, the intersection point of the x axis with the separating line 2, a clear jump which comes about through different fluorescence properties of the authentic partial bank note 1*a* and of the false partial bank note 1*b*. Furthermore, in the measuring track m a clearly elevated signal intensity is to be recognized in the area of the fluorescent security element 3. The signal intensity $s_{m+1}$ has no elevated signal intensity at the x coordinates of the security element 3, because the measuring track m+1 no longer detects the fluorescence of the security element 3. The gradient values $g_m$ and $g_{m+1}$ result from the signal intensities $s_m$ and $s_{m+1}$ by calculation of the absolute value of the first derivative of the particular signal intensity in the transport direction x.

Furthermore, there are also determined from the remaining measuring tracks of the detector row 5 the signal intensities $s_1, s_2, \ldots$ and the associated gradient values $g_1, g_2, \ldots$ in each case. There is thus obtained a two-dimensional distribution of the signal intensities and of the gradient values over the total composed forgery 1. At the place $x_T$ not only the gradient values $g_m$ and $g_{m+1}$ but also the gradient values of the remaining measuring tracks have a peak, in accordance with a jump in the particular signal intensity.

Figure 2A:
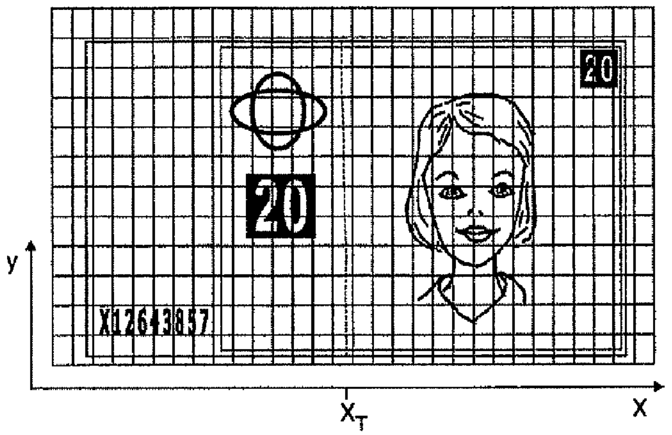
Figure 2B:
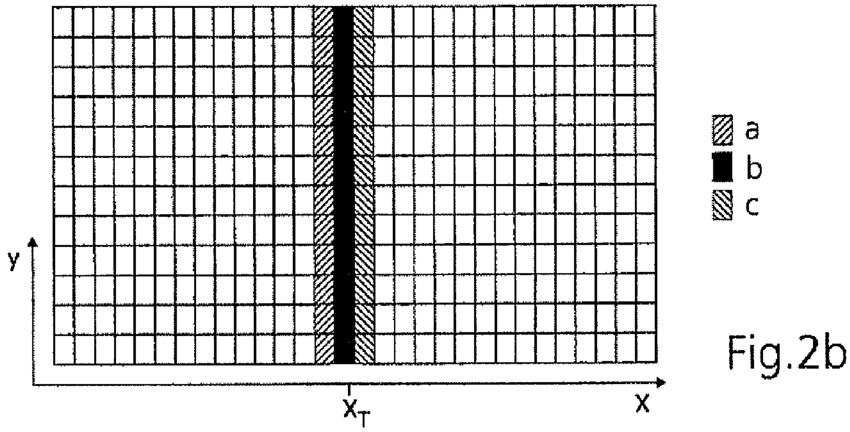

FIG. 2*a* illustrates the two-dimensional arrangement of the measuring points, which are shown as cells of a grid in the x-y plane, and their position with respect to the composed forgery 1. Each measuring track of the detector row 5 corresponds to a line of the grid. After determination of the gradient values at each of the measuring points a plurality of groups of measuring points are formed. The measuring points of each group are disposed in each case along a certain direction on the value document. FIG. 2*b* shows by way of example three groups a, b, c whose measuring points are disposed along the y direction and parallel to each other. The measuring points of the three groups a, b, c are so selected in this example that the signal intensities are detected thereat in the area of the separating line 2 and in the immediate surroundings thereof.

In the table of FIG. 2*c* there are specified in the lines 1-12 by way of example gradient values of the measuring points of the three groups a, b, c. From the gradient values of the individual groups a, b, c there is in each case determined a connection strength $V_a$, $V_b$, $V_c$ by multiplication of the gradient values within each group of measuring points. From the gradient values of the group b there results a very great connection strength $V_b$ in comparison to the groups a and c. For evaluation, the connection strengths $V_a$, $V_b$, $V_c$ of the individual groups are subsequently compared to the reference connection strengths $R_a$, $R_b$, $R_c$ which are valid for the particular group and which were ascertained e.g. prior to the check on the basis of authentic value documents. The connection strengths $V_a$ and $V_c$ are clearly smaller than the respective reference connection strength $R_a$ and $R_c$. By contrast, the connection strength $V_b$ is clearly greater than the associated reference connection strength $R_b$. From the relatively great connection strength $V_b$ it can be inferred that a separating line 2 extends with high probability within the measuring points of the group b. The checked value document can thus be sorted out on suspicion of the presence of a composed forgery 1.

Figure 3:
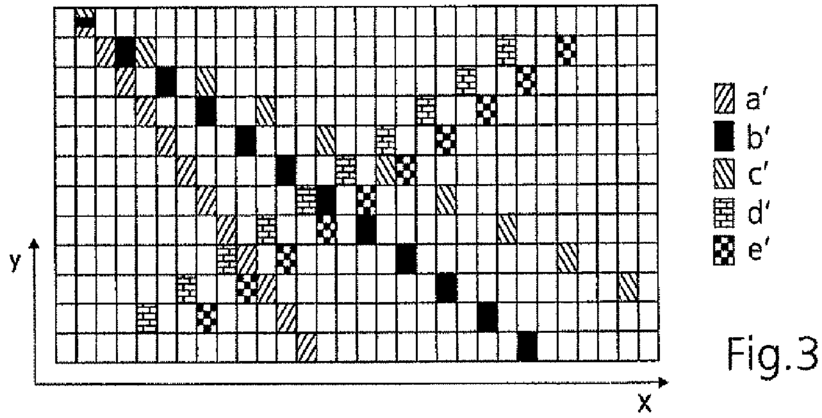

FIG. 3 shows examples of further groups a'-e' of measuring points. The measuring points of the groups a'-c' are disposed in a star shape, starting out here from the second measuring point of the first line of the measuring point grid, over the value document 1 at different angles. In the same manner it is possible to employ a plurality of freely selected measuring points as starting measuring points. The measuring points of the groups d' and e' are disposed parallel to each other and extend at a non-zero angle to the transport direction x over a portion of the value document 1. The measuring points located at the edge of the value document 1 were excluded in the groups d' and e'. By means of said groups it is also possible to recognize composed forgeries whose separating lines extend obliquely across the composed forgery.

For the inventive method it is possible to select not only groups with measuring points disposed transversely or obliquely to the bank note, but also those groups whose measuring points are disposed in the longitudinal direction of the bank note. Furthermore, the measuring points of a group can also be so disposed that they are not on a line. The measuring points of a group can instead also be on a curve and/or the arrangement of the measuring points can be offset, e.g. in order to recognize composed forgeries with accordingly extending separating lines.

The invention claimed is:

1. A method for checking value documents for the presence of separating lines at which the value document is assembled comprising the steps:
- determining signal intensities of a measuring signal at a plurality of measuring points on a value document,
- selecting measuring points from the plurality of measuring points on the value document to form a group of the measuring points, wherein the selection of the group is effected in dependence of a typical separating line position on the value document,
- determining gradient values of the signal intensities for the measuring points of the group, linking the gradient values of the group of measuring points on the value document for ascertaining a connection strength of the group, wherein the connection strength is determined from the gradient values of the group of measuring points on the value document, and evaluating the connection strength.

2. The method according to claim 1, wherein, for evaluating the connection strength, the connection strength is compared to a reference connection strength.

3. The method according to claim 2, wherein from a difference between the connection strength and the reference connection strength, deriving a probability of at least a segment of a separating line disposed in the group of measuring points.

4. The method according to claim 1, wherein, for determining the signal intensities there is determined at least one curve of the signal intensity as a function of the place on the value document.

5. The method according to claim 4, wherein the two-dimensional distribution of the signal intensity is determined over the total value document or over at least a partial area of the value document.

6. The method according to claim 1, wherein the connection strength of the group is ascertained by forming a product or a sum of the gradient values of the group.

7. The method according to claim 1, wherein the signal intensities are normalized to reference intensities by normalizing the signal intensity at each of the measuring points to a reference intensity valid for the particular measuring point.

8. The method according to claim 2, wherein the reference connection strength is ascertained or has been ascertained on the basis of a multiplicity of authentic value documents on the basis of a multiplicity of value documents of the type of the value document.

9. The method according to claim 1, wherein for determining the gradient values of the group at least a first derivative of the signal intensity is formed along a first direction on the value document, the gradient value at least at one measuring point of the group being proportional to the absolute value of the first derivative at the measuring point.

10. The method according to claim 1, wherein for determining the gradient values of the group at least one difference of the signal intensity at a measuring point of the group and of the signal intensity, at least at one neighboring measuring point is formed, the neighboring measuring point being neighboring to the measuring point along a first direction on the value document, the gradient value at least at one measuring point of the group being in particular proportional to the absolute value of the difference.

11. The method according to claim 10, wherein the first direction extends along a transport direction of the value document which extends in particular approximately parallel to a longitudinal direction of the value document or approximately perpendicular to the longitudinal direction.

12. The method according to claim 1, wherein the measuring points of the group are disposed along a second direction on the value document.

13. The method according to claim 12, wherein for determining the gradient values of the group at least a first derivative of the signal intensity is formed along a first direction on the value document, the gradient value at least at one measuring point of the group being proportional to the absolute value of the first derivative at the measuring point and the second direction extends at a non-zero angle to the first direction, in particular vertically to the first direction.

14. The method according to claim 1, wherein the measuring signal is an optical measuring signal.

15. The method according to claim 1, including the further steps of:

selecting at least one further group of the measuring points, determining further gradient values of the signal intensities for the measuring points of at least one of the further groups, linking the further gradient values of at least one of the further groups for ascertaining at least one further connection strength, evaluating at least one of the further connection strengths.

16. The method according to claim 15, wherein, for evaluation, at least one of the further connection strengths is compared to at least one further reference connection strength.

17. The method according to claim 15, wherein the selection of at least one of the further groups is effected in dependence on the value of the connection strength according to claim 1 and/or in dependence of a difference between the connection strength of the group and a reference connection strength.

18. The method according to claim 15, wherein the further group is or contains a subset of the group as determined according to claim 1.

19. The method according to claim 15, wherein, through the group selected according to claim 1, an area of the value document is checked and through at least one of the further groups a part of the area and/or immediate surroundings of the area are checked, with the area and/or the immediate surroundings of the area being checked at different angles.

20. The method according to claim 15, wherein the measuring points of the group selected according to claim 1 and the measuring points of at least one of the further groups are disposed parallel to each other on the value document.

21. The method according to claim 15, wherein the measuring points of the group selected according to claim 1 and the measuring points of at least one of the further groups are disposed along different directions on the value document.

22. An apparatus for carrying out a method for checking value documents for the presence of separating lines at which the value document is assembled, comprising:

a transport device configured to transport a value document along a transport direction;

at least one sensor for determining signal intensities of a measuring signal at a plurality of measuring points on the value document; and a controller configured to select measuring points from the plurality of measuring points on the value document to form a group of the measuring points, determine gradient values of the signal intensities for the measuring points of the group, link the gradient values of the group of measuring points on the value document for ascertaining a connection strength of the group, and evaluate the connection strength to determine if the value document is a forgery, wherein the selection of the group is effected in dependence of a typical separating line position on the value document, and wherein the connection strength is determined from the gradient values of the group of measuring points on the value document.

* * * * *